US006534569B2

(12) United States Patent
Mahmud et al.

(10) Patent No.: US 6,534,569 B2
(45) Date of Patent: Mar. 18, 2003

(54) POLYMERS CONTAINING MODIFIED PIGMENTS AND METHODS OF PREPARING THE SAME

(75) Inventors: Khaled Mahmud, Natick, MA (US); James A. Belmont, Acton, MA (US); Yakov E. Kutsovsky, Arlington, MA (US); Wayne Devonport, Tewksbury, MA (US); Meng-Jiao Wang, Lexington, MA (US); Collin P. Galloway, Nashua, NH (US); Gregory J. Mehos, Westford, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/768,492

(22) Filed: Jan. 24, 2001

(65) Prior Publication Data

US 2002/0006984 A1 Jan. 17, 2002

Related U.S. Application Data

(60) Provisional application No. 60/178,257, filed on Jan. 25, 2000.

(51) Int. Cl.$^7$ ................................................ C08K 3/00
(52) U.S. Cl. ..................................................... 523/333
(58) Field of Search .......................................... 523/333

(56) References Cited

U.S. PATENT DOCUMENTS

| | | | |
|---|---|---|---|
| 3,691,129 A | 9/1972 | Burke, Jr. .................. 260/33.6 |
| 3,884,964 A | * 5/1975 | Otrhalek .................... 260/486 |
| 3,904,562 A | * 9/1975 | Hopfenberg ................. 260/22 |
| 4,031,060 A | * 6/1977 | Hackert ........................ 260/37 |
| 5,275,900 A | 1/1994 | Ong et al. .................. 430/106 |
| 5,278,018 A | 1/1994 | Young et al. ................ 430/110 |
| 5,484,575 A | 1/1996 | Steenackers ................. 422/176 |
| 5,510,221 A | 4/1996 | Matalevich et al. ..... 430/106.6 |
| 5,510,436 A | * 4/1996 | Hille .......................... 526/240 |
| 5,537,934 A | * 7/1996 | Jensen ........................ 106/487 |
| 5,554,739 A | 9/1996 | Belmont ..................... 534/885 |
| 5,559,169 A | 9/1996 | Belmont et al. ............ 523/215 |
| 5,571,311 A | 11/1996 | Belmont et al. .......... 106/20 R |
| 5,571,654 A | 11/1996 | Ong ........................... 430/110 |
| 5,575,845 A | 11/1996 | Belmont et al. ............ 106/712 |
| 5,630,868 A | 5/1997 | Belmont et al. ......... 106/31.75 |
| 5,663,224 A | 9/1997 | Emmons et al. ............ 524/188 |
| 5,672,198 A | 9/1997 | Belmont ................... 106/20 R |
| 5,698,016 A | 12/1997 | Adams et al. ............. 106/31.6 |
| 5,707,432 A | 1/1998 | Adams et al. ............. 106/31.6 |
| 5,713,988 A | 2/1998 | Belmont et al. ........... 106/31.6 |
| 5,763,388 A | 6/1998 | Lightsey et al. ............ 523/212 |
| 5,803,959 A | 9/1998 | Johnson et al. .......... 106/31.75 |
| 5,830,930 A | 11/1998 | Mahmud et al. ............ 523/215 |
| 5,837,045 A | 11/1998 | Johson et al. ............ 106/31.85 |
| 5,851,280 A | 12/1998 | Belmont et al. ............ 106/472 |
| 5,869,550 A | 2/1999 | Mahmud et al. ............ 523/215 |
| 5,877,238 A | 3/1999 | Mahmud et al. ............ 523/215 |
| 5,885,335 A | 3/1999 | Adams et al. ............... 106/316 |
| 5,895,522 A | 4/1999 | Belmont et al. ........... 106/31.6 |
| 5,900,029 A | 5/1999 | Belmont et al. ............... 8/550 |
| 5,904,762 A | 5/1999 | Mahmud et al. ............ 106/475 |
| 5,916,934 A | 6/1999 | Mahmud et al. ............ 523/215 |
| 5,919,841 A | 7/1999 | Mahmud et al. ............ 523/351 |
| 5,922,118 A | 7/1999 | Johnson et al. ........... 106/31.6 |
| 5,948,835 A | 9/1999 | Mahmud et al. ............ 523/215 |
| 5,955,232 A | 9/1999 | Little et al. .................. 430/106 |
| 5,977,213 A | 11/1999 | Mahmud et al. ............ 523/351 |
| 5,985,953 A | 11/1999 | Lightsey et al. ............ 523/212 |
| 6,008,272 A | 12/1999 | Mahmud et al. ............ 523/351 |
| 6,040,364 A | 3/2000 | Mabry et al. ............... 523/318 |
| 6,048,923 A | 4/2000 | Mabry et al. ............... 524/496 |
| 6,075,084 A | 6/2000 | Mabry et al. ............... 524/495 |
| 6,086,841 A | 7/2000 | Lee ......................... 423/449.1 |
| 6,313,246 B1 | * 11/2001 | Carter ......................... 526/258 |

FOREIGN PATENT DOCUMENTS

| | | | |
|---|---|---|---|
| DE | 198 16 972 A1 | 11/1999 | |
| EP | 0 270 066 A1 | 6/1988 | |
| EP | 0 955 343 A1 | 11/1999 | |
| WO | WO 96/18688 | 6/1996 | |
| WO | WO 96/37547 | 11/1996 | |
| WO | WO 97/36724 | 10/1997 | |
| WO | WO 97/47692 | 12/1997 | |
| WO | WO 97/47697 | 12/1997 | |
| WO | WO 97/47699 | 12/1997 | |
| WO | WO 98/42778 | 10/1998 | |
| WO | WO 99/16600 | 4/1999 | |
| WO | WO 99/31175 | 6/1999 | |
| WO | WO99/41304 | 8/1999 | |
| WO | WO 01/55254 | 4/2000 | ............ C09C/1/56 |
| WO | WO 00/22051 | 8/2001 | ............ C08K/9/04 |

OTHER PUBLICATIONS

U.S. Provisional patent application No. 60/129,791, filed Apr. 16, 1999.
Copy of WO 01/55245 A3 with copy of International Search Report published Dec. 20, 2001.

* cited by examiner

*Primary Examiner*—Edward J. Cain

(57) ABSTRACT

A variety of methods to prepare a polymer composition containing at least one polymer and at least one modified pigment are described. The methods, in part, involve introducing a slurry containing at least one modified pigment into an emulsion or solution polymer prior to dewatering. Other polymer systems can be used including aqueous based polymerizations and solvent-based polymerizations, which can include free radical polymerizations. Other methods involve the formation of a modified pigment in the presence of an emulsion or solution polymer and then recovering the polymer composition containing the modified pigment. Compositions containing at least one modified pigment and the emulsion or solution polymer are also described as well as uses for the polymer compositions of the present invention.

29 Claims, No Drawings

US 6,534,569 B2

POLYMERS CONTAINING MODIFIED PIGMENTS AND METHODS OF PREPARING THE SAME

This application claims the benefit under 35 U.S.C. §119(e) of prior U.S. Provisional Patent Application No. 60/178,257 filed Jan. 25, 2000, which is incorporated in its entirety by reference herein.

BACKGROUND OF THE INVENTION

The present invention relates to polymer compositions and more particularly relates to polymer compositions containing modified pigments and methods of making the same.

U.S. Pat. Nos. 5,559,169 and 5,851,280, incorporated in their entirety by reference herein, describe polymer compositions containing modified carbon products which are useful in a variety of applications, such as plastics, tires, and other polymer goods.

In making the polymer compositions containing the modified carbon products or modified pigments, it would be beneficial if improved methods could be devised to incorporate the modified pigments into the polymer compositions. Typically, modified pigments, such as modified carbon black, are formed in an aqueous solution and this resulting slurry is dried, resulting in a dry modified carbon black. This dry modified carbon black can then be incorporated into polymer compositions and other compositions such as inks and coatings. Thus, substantial cost is incurred in drying the modified carbon black and in redispersing the product in the polymer. Additionally, the modification process results generally in the production of byproducts such as salts which are not readily eliminated from the product.

The disclosed invention allows for a substantially improved and more economical process. The separate drying step for the carbon black may be eliminated. Additionally, the salt associated with the product may be more readily eliminated. Furthermore, the resulting elastomeric compound containing the carbon black and the polymer will not require a separate redispersion step. Also, the elastomeric compound will have a good carbon black dispersion and therefore result in improved properties.

SUMMARY OF THE INVENTION

A feature of the present invention is to provide processes for incorporating modified pigments into polymer compositions.

Another feature of the present invention is to provide methods of introducing modified pigments into polymer compositions which result in economical savings as well as reducing the amount of time necessary to prepare polymer compositions containing modified pigments.

Another feature of the present invention is to provide products with superior dispersion of the components.

Another feature of the present invention is to provide products with improved performance.

Another feature of the present invention is to provide products substantially without the associated byproducts.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages, and in accordance with the purposes of the present invention, as embodied and broadly described herein, the present invention relates to a method of preparing a polymer composition comprising at least one polymer and at least one modified pigment. The method involves introducing at least one slurry containing at least one modified pigment to a polymer solution to form a mixture. The modification of the filler is preferably done in an aqueous medium. At this stage, the polymer solution has not been dewatered. After introducing the slurry, the mixture is then dewatered to form the polymer composition. The polymer solution can be a polymer emulsion, a polymer suspension, or a polymer prepared by free radical polymerization. In addition, polymers prepared by solvent based polymerizations can also benefit from the methods of the present invention.

The present invention also relates to a method of preparing the polymer composition by introducing at least one slurry containing at least one modified pigment to a solution of the precursor of an emulsion polymer. Polymerization of the precursor is then initiated to form a polymer product. This product is then dewatered to form the polymer composition of the present invention.

In another method of preparing the polymer composition, the method involves attaching at least one organic group onto a pigment in the presence of a polymer emulsion to form a polymer product. This product is then dewatered to form the polymer composition of the present invention.

In addition, the present invention relates to a method of forming a polymer composition by attaching at least one organic group onto a pigment in the presence of a quenched and unwashed solution of a polymer prepared by solution or suspension polymerization and solvent. The mixture can then be washed and dewatered to form the polymer composition of the present invention.

In a further method of the present invention, a polymer composition is formed by introducing at least one slurry containing at least one modified carbon black or pigment to a quenched solution of a polymer prepared by solution or suspension polymerization to form a mixture. This mixture is then washed and dewatered to form the polymer composition of the present invention.

In a further method, the filler or pigment can be treated in the aqueous phase of an emulsion or mixture of water and an organic solvent. The modified filler or pigment is then transferred to the organic solvent after treatment. This organic solvent solution can be mixed with the solution of a polymer that is already formed or with the polymer precursor solution. After formation of the polymer, the resulting product can be washed and dewatered.

Finally, the present invention relates to a method of preparing a polymer composition by introducing a modified pigment having attached at least one organic group into a solution containing at least one living polymer. The living polymer can then be terminated by any technique including the option of at least one organic group having a group capable of terminating the living polymer and thus form a polymer composition of the present invention.

It is to be understood that both the foregoing general description and the following detailed description are exemplary and explanatory only and are intended to provide further explanation of the present invention, as claimed.

DETAILED DESCRIPTION OF THE PRESENT INVENTION

The present invention relates to methods of preparing polymer compositions containing modified pigments, wherein the modified pigment has attached at least one organic group. The present invention further relates to the resulting products from these methods as well as the intermediate mixtures or compositions formed during the methods of the present invention.

The modified pigment is a pigment having attached at least one organic group. Examples of the pigment include, but are not limited to, any colored pigment, carbon black, carbon fibers, activated carbon, graphite, activated graphite, carbon cloth, vitreous carbon, and the like. Preferably, the modified pigment is a modified carbon product, such as modified carbon black. The organic group which is attached onto the pigment can be any variety of organic groups such as those described in U.S. Pat. Nos. 5,955,232; 5,922,118; 5,575,845; 5,630,868; 5,900,029; 5,895,522; 5,885,335; 5,851,280; 5,837,045; 5,803,959; 5,672,198; 5,571,311; 5,630,868; 5,707,432; 5,803,959; 5,554,739; 5,698,016; and 5,713,988; and PCT Publication Nos. WO 96/18688; WO 97/47697; WO 99/31175; WO 99/41304; WO 97/47692; and WO 97/47699; all incorporated in their entireties by reference herein.

Also, for purposes of the present invention, a modified carbon product includes an aggregate comprising a carbon phase and a silicon-containing species phase. A description of this aggregate as well as means of making this aggregate are described in PCT Publication No. WO 96/37547 as well as U.S. Pat. Nos. 5,830,930; 6,008,272; 5,977,213; 5,948,835; 5,919,841; 5,904,762; 5,877,238; and 5,869,550. This modified carbon product can be used as is or can have an organic group attached thereto. All of these patents, publications, and patent applications are hereby incorporated in their entireties herein by reference.

The modified carbon product, for purposes of the present invention, can also be an aggregate comprising a carbon phase and metal-containing species phase where the metal-containing species phase can be a variety of different metals such as magnesium, calcium, titanium, vanadium, cobalt, nickel, zirconium, tin, antimony, chromium, neodymium, lead, tellurium, barium, cesium, iron, molybdenum, aluminum, and zinc, and mixtures thereof. The aggregate comprising the carbon phase and a metal-containing species phase is described in U.S. Pat. Nos. 6,017,480 and 6,150,453 and PCT Publication No. WO 98/42778 also hereby incorporated in their entireties herein by reference. This carbon product can be used as is or can have an organic group attached thereto.

Also, for purposes of the present invention, a modified carbon product includes a silica-coated carbon black, such as that described in PCT Publication No. WO 96/37547, published Nov. 28, 1996, and U.S. Pat. No. 5,916,934 also hereby incorporated in their entireties herein by reference. This modified carbon product can be used as is or can have an organic group attached thereto.

Depending on the polymer composition, different organic groups are preferred. For instance, if the polymer composition is used in the formation of a tire or a component of a tire, preferably, the organic groups are aromatic sulfides or thiols, or the organic groups consist of amines, ionic groups, hydroxyl groups, sulfur containing groups such as polysulfides, sulfenamide groups, esters, ketones, or halogen containing groups. Another group is phenylsulfatoethylsulfone which can be used to make a charge stabilized dispersion of the filler or pigment in water and then used later to provide improved filler polymer interaction once in contact with the polymer.

Modified pigments, especially modified carbon products having aromatic sulfide groups are particularly useful in elastomer or rubber compositions. These aromatic sulfides can be represented by the formulas $Ar(CH_2)_qS_k(CH_2)_rAr'$ or $A$—$(CH_2)_qS_K(CH_2)_rAr''$ wherein Ar and Ar' are independently substituted or unsubstituted arylene or heteroarylene groups, Ar" is an aryl or heteroaryl group, k is 1 to 8 and q and r are 0–4. Substituted aryl groups would include substituted alkylaryl groups. Arylene groups can include phenylene groups, particularly p-phenylene groups, or benzothiazolylene groups. Aryl groups can include phenyl, naphthyl and benzothiazolyl. The number of sulfurs present, defined by k preferably ranges from 2 to 4. Modified carbon products can have an attached aromatic sulfide organic group of the formula —$(C_6H_4)$—$S_k$—$(C_6H_4)$—, where k is an integer from 1 to 8, and more preferably where k ranges from 2 to 4. Aromatic sulfide groups can be bis-para-$(C_6H_4)$—$S_2$—$(C_6H_4)$— and para-$(C_6H_4)$—$S_2$—$(C_6H_5)$. The diazonium salts of these aromatic sulfide groups may be conveniently prepared from their corresponding primary amines, $H_2N$—Ar—$S_k$—Ar'—$NH_2$ or $H_2N$—Ar—$S_k$—Ar". Groups include dithiodi-4,1-phenylene, tetrathiodi-4,1-phenylene, phenyldithiophenylene, dithiodi-4,1-(3-chlorophenylene), -(4-$C_6H_4$)—S—S-(2-$C_7H_4$NS), -(4-$C_6H_4$)—S—S-(4-$C_6H_4$)—OH, -6-(2-$C_7H_3$NS)—SH, -(4-$C_6H_4$)—$CH_2CH_2$—S—S—$CH_2CH_2$-(4-$C_6H_4$)—, -(4-$C_6H_4$)—$CH_2CH_2$—S—S—S—$CH_2CH_2$-(4-$C_6H_4$)—, -(2-$C_6H_4$)—S—S-(2-$C_6H_4$)—, -(3-$C_6H_4$)—S—S-(3-$C_6H_4$)—, -6-($C_6H_3N_2S$), -6-(2-$C_7H_3$NS)—S—NRR' where RR' is —$CH_2CH_2OCH_2CH_2$—, -(4-$C_6H_4$)—S—S—S—S-(4-$C_6H_4$)—, -(4-$C_6H_4$)—CH=$CH_2$-(4-$C_6H_4$)—S—$SO_3$H, -(4-$C_6H_4$)—$SO_2$NH-(4-$C_6H_4$)—S—S-(4-$C_6H_4$)—$NHSO_2$-(4-$C_6H_4$)—, -6-(2-$C_7H_3$NS)—S—S-2-(6-$C_7H_3$NS)—, -(4-$C_6H_4$)—S—$CH_2$-(4-$C_6H_4$)—, -(4-$C_6H_4$)—$SO_2$—S-(4-$C_6H_4$)—, -(4-$C_6H_4$)—$CH_2$—S—$CH_2$-(4-$C_6H_4$)—, -(3-$C_6H_4$)—$CH_2$—S—$CH_2$-(3-$C_6H_4$)—, -(4-$C_6H_4$)—$CH_2$—S—$CH_2$-(4-$C_6H_4$)—, -(3-$C_6H_4$)—$CH_2$—S—S—$CH_2$-(3-$C_6H_4$)—, -(4-$C_6H_4$)—S—NRR' where RR' is —$CH_2CH_2OCH_2CH_2$—, -(4-$C_6H_4$)—$SO_2NH$—$CH_2CH_2$—S—S—$CH_2CH_2$—$NHSO_2$-(4-$C_6H_4$)—, -(4-$C_6H_4$)-2-(1,3-dithianyl;), and -(4-$C_6H_4$)—S-1,4-piperizinediyl)—S-(4-$C_6H_4$)—.

Another set of organic groups which may be attached to the pigment are organic groups having an aminophenyl, such as $(C_6H_4)$—$NH_2$, $(C_6H_4)$—$CH_2$—$(C_6H_4)$—$NH_2$, $(C_6H_4)$—$SO_2$—$(C_6H_4)$—$NH_2$. Organic groups also include aromatic sulfides, represented by the formulas Ar—$S_n$—Ar' or Ar—$S_n$—Ar", wherein Ar and Ar' are independently arylene groups, Ar" is an aryl and n is 1 to 8.

Preferably, the organic group comprises an aromatic group and/or a $C_1$–$C_{100}$ alkyl group (and more preferably a $C_1$–$C_{12}$ alkyl group) directly attached to the pigment, with or without an ionic, ionizable, or polar group to improve dispersion in aqueous media. For dispersions in organic solvents such as toluene, the attached group is preferably non-polar or non-ionic.

More than one type of organic group can be attached to the pigment, or two or more types of modified pigments with different attached organic groups can be used. Using two or more different types of organic groups permits a combination of properties. If two different types of organic groups are attached, for example, a benzene sulfonic acid group and a vinyl aromatic group, the sulfonic acid group promotes dispersibility and the vinyl aromatic group serves as a radical grafting site. The ratio of the different organic groups can be the same or different. Preferably, only the minimum treatment level of the ionic, ionizable, or polar group is used to impart stability to the dispersion. For example, groups such as ionic species (e.g., sulphates, phosphates, alkali salts of organic acids or quaternary ammonium salts), non-ionic species (e.g., hydroxyl, organic acids) or surfactant stabilizers (e.g., SDMS, SDS, Antarox) can be used to provide stable pigment dispersions in aqueous media. Dispersion of the modified pigment in organic liquids can be facilitated in a similar manner by employing treatments which are more compatible with these less polar environments. Treatment levels of the organic group for purposes of radical grafting sites can depend on material uses. For instance, attachment of epoxy groups would facilitate grafting to hydroxyl bearing polymer matrices such as polyurethanes or polycarbonates or amine matrices such as nylon. Other examples include the attachment of radical sensitive vinyl groups such as styrenics or acrylates, to facilitate crosslinking type reactions in radical polymerizations. These attached groups would ultimately affect the properties of the materials containing these modified pigments. The properties that would be affected include, but are not limited to, impact behavior, modulus response, and dispersibility in plastics.

Also, a combination of different modified pigments can be used. For instance, a modified pigment having one type of organic group attached thereto can be used in combination with another modified pigment having a different organic group attached thereto. Also, a modified pigment such as an aggregate comprising a carbon phase and a silicon-containing species phase can be used in combination with a modified carbon product having an attached organic group, and so on.

At least one organic group can be attached onto a pigment by a variety of mechanisms such as those described in the above-described patents and publications. Preferably, the organic group is attached chemically such as by covalent and/or ionic bonds.

One process for attaching an organic group to the pigment involves the reaction of at least one diazonium salt with a pigment in the absence of an externally applied current sufficient to reduce the diazonium salt. That is, the reaction between the diazonium salt and the pigment proceeds without an external source of electrons sufficient to reduce the diazonium salt. Mixtures of different diazonium salts may be used in the process of the invention. This process can be carried out under a variety of reaction conditions and in any type of reaction medium, including both protic and aprotic solvent systems or slurries.

In another process, at least one diazonium salt reacts with a pigment in a protic reaction medium. Mixtures of different diazonium salts may be used in this process of the invention. This process can also be carried out under a variety of reaction conditions. In both processes, the diazonium salt can be formed in situ.

The processes can be carried out in any reaction medium which allows the reaction between the diazonium salt and the pigment to proceed. The reaction medium can be a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain an acidic hydrogen as defined above. Aprotic solvents include, for example, solvents such as hexanes, tetrahydrofuran (THF), acetonitrile, and benzonitrile. For a discussion of protic and aprotic solvents see Morrison and Boyd, Organic Chemistry, 5th Ed., pp. 228–231, (Allyn and Bacon, Inc. 1987). The reaction between a diazonium salt and a carbon product can take place with any type of carbon product, for example, in fluffy or pelleted form.

The polymer in which at least one modified pigment is combined with can be any polymer including natural products and synthetic products. The polymer can be any type of polymer, such as a random polymer, alternating polymer, graft polymer, block polymer, star-like polymer, and/or comb-like polymer. The polymer can also be one or more polyblends. The polymer can be an interpenetrating polymer network (IPN); simultaneous interpenetrating polymer network (SIN); or interpenetrating elastomeric network (IEN). The polymer can be thermoplastic or thermosettable.

Examples of polymers include, but are not limited to, olefin-containing, diene-containing and butene-containing polymers and copolymers. Particular examples include elastomers such as solution SBR, natural rubber, emulsion SBR, polybutadiene, polyisoprene, NBR, EPDM, EPM, isobutene elastomers, and their functionalized or modified derivatives or blends thereof.

Other examples of polymers include, but are not limited to, linear and non-linear polymers such as polyethylene, poly(vinylchloride), polyisobutylene, polystyrene, polycaprolactam (nylon), polyisoprene, and the like. Other general classes of polymers include polyamides, polycarbonates, polyelectrolytes, polyesters, polyethers, (polyhydroxy) benzenes, polyimides, polymers containing sulfur (such as polysulfides, (polyphenylene)sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene, polydicyclopentadiene), polyolefin copolymers, polyphenylene oxides, polyurethanes, thermoplastic elastomers, silicone polymers, alkyd, epoxy, unsaturated polyester, vinyl ester, urea-, melamine-, or phenol-formaldehyde resins, and the like. Preferably, the polymer is an acrylic polymer, a methacrylic polymer, or a styrenic polymer, but would largely depend upon the intended application. For instance, reinforcement applications would generally involve the formation of a rubber product that could be attached to the modified carbon product in a manner such that the rubber product is preferably not extractable, e.g., not extractable in solvents. This can be accomplished by using a modified carbon product that has styrenic groups attached to the surface. During an aqueous media radical polymerization, the propagating chains could graft to these sites on the surface of the modified carbon product and generate a rubbery coated particle.

The polymers that are used in the methods of the present invention are preferably formed from aqueous mediated polymerization environments such as emulsion polymerizations and suspension polymerizations and in general, free radical polymerizations. Also, solvent based polymerizations can be used as well. Accordingly, while emulsion polymerization and solution polymerization are discussed in detail below, these methods can be adapted to free radical polymerizations in general including, but not limited to, suspension polymerizations and solvent based polymerizations.

Many of the above-identified polymers can be prepared by emulsion polymerization techniques and/or solution polymerization techniques. For instance, styrene butadiene rubber can be prepared by emulsion polymerization techniques. Those skilled in the art will have a full appreciation for the various polymerization techniques that can be used in the formation the abovedescribed polymers.

A variety of methods can be used to prepare a polymer composition containing at least one polymer and at least one modified pigment. Generally, the conventional ingredients used to conduct the polymerization can be used in conventional amounts in these methods, such as an initiator, surface active agents, inhibiting or quenching agents, cross-linking agents, and the like.

In one embodiment, the polymer composition containing at least one polymer and at least one modified pigment is prepared by introducing at least one slurry containing at least one modified pigment to a polymer emulsion that has not been dewatered. The introduction of the slurry to the polymer emulsion can be considered a mixture for purposes of the present invention. This mixture is then dewatered to form the polymer composition of the present invention. Dewatering for purposes of the present invention includes the removal of the aqueous or solvent phase, which may be the continuous phase, to recover the formed polymer.

Conventional techniques can be used to accomplish the dewatering of the mixture including decanting, filtering, and the like.

In another method of the present invention, a polymer composition can be formed by introducing at least one slurry containing at least one modified pigment to a precursor of a polymer emulsion. The precursor of the polymer emulsion is the components which upon polymerization will result in a polymer emulsion. Once the slurry is introduced into the precursor of the polymer emulsion, the polymerization can be initiated to form a polymer product. This polymer product can then be dewatered to recover the polymer composition of the present invention.

Besides the above processes, the polymer composition can be made by forming the modified pigment in the presence of the polymer emulsion. In particular, the process involves attaching at least one organic group onto a pigment in the presence of a polymer emulsion to form a product. This product is then dewatered as described above. In such a process, the reactants relating to the formation of a modified pigment as described in the above-mentioned patents and publications are used in the presence of a polymer emulsion to conduct the reaction which will result in the attachment of at least one organic group onto the pigment. Once this reaction has been accomplished to form the modified pigment, the modified pigment in the presence of the polymer emulsion is subjected to a dewatering process to result in the polymer composition of the present invention.

Generally, any salts or byproducts formed as a result of the treatment of the filler or pigment are eliminated via the washing and dewatering process of the polymer product.

In another embodiment of the present invention, a polymer composition is formed by introducing at least one slurry containing at least one modified pigment to a quenched solution of a polymer, for instance, prepared by solution or suspension polymerization to form a mixture. Essentially, in this process, a solution polymer system is used wherein prior to washing the polymer solution, but after quenching of the polymer solution, the slurry containing at least one modified pigment is introduced. Once introduced, the slurry present with the polymer solution which is quenched is then washed using conventional techniques known to those skilled in the art in recovering any polymer from a solution polymerization.

In yet another embodiment of the present invention, a polymer composition is formed by attaching at least one organic group onto a pigment in the presence of a quenched and unwashed solution of a polymer, for instance, prepared by solution or suspension polymerization and a solvent. Like one of the embodiments mentioned above, in this embodiment, the modified pigment is actually formed in the polymer solution and in the presence of the components used in the solution polymerization. In this case, the modification would occur in a two-phase mixture of organic solvent and water. The treated pigment or filler is transferred to the solvent phase. Thus, the reactants which are used to form a modified pigment as described in the above-mentioned patents and publications are introduced in the solution polymer and the reaction initiated to form the modified pigment. Once the modified pigment is formed in the presence of a quenched and unwashed solution polymer, the solution polymer containing the modified pigment is then washed using conventional techniques to recover the polymer composition of the present invention.

Finally, in another embodiment of the present invention, a polymer composition is formed wherein a modified dry pigment or filler having attached at least one organic group is introduced into a solution containing at least one living polymer. Preferably, the modified pigment having attached at least one organic group has a component on the organic group which is a terminating group capable of terminating the polymerization. Examples of such groups are esters, ketones, amines, and thiols.

The slurry containing modified pigment can be prepared in a variety of ways. The slurry can be made by adding agglomerates of carbon black or other pigment (pellets) to water. Preferably, the pigment particles in the slurry are free of agglomerates so that they will readily disperse in the polymer. One method of producing an agglomerate-free modified pigment slurry is to make a paste containing micropulverized solids. A device such as a ball mill is used to micropulverize the pigment in the presence of a liquid such as water or a solvent. Alternatively, a device such as a ball mill can be used to deagglomerate the pigment without any liquid, and then adding the micropulverized pigment downstream in a mixer.

The methods of the present invention can be incorporated into the inventions described in WO 99/16600; WO 97/36724; and U.S. Provisional Application No. 60/129,791; all incorporated in their entireties by reference herein.

The intermediate products described above are considered part of the present invention and are unique in the manner in which the modified pigment is incorporated into the polymer. Thus, the presence of the slurry containing the modified pigment in the presence of the polymer solution in an aqueous based or solvent based system are considered part of the present invention and considered novel mixtures or compositions.

The polymer compositions of the present invention can be used in a number of ways and in a number of applications including, but not limited to, the following reinforcement applications, rubber articles, plastic articles, and the like.

For instance, the modified pigment products of this invention can be used as colorants in a plastic material. The modified pigment products of the invention can also be used to impart conductivity to a plastic material. The modified pigment products of the invention may give an increased rate of dispersion or improved quality of dispersion over the corresponding untreated pigment. These improvements offer an economic advantage in plastic manufacture and in value of the finished product, respectively. Using the modified pigment products of the invention may improve impact strength of the plastic. Thus, the invention relates to an improved plastic composition comprising a plastic and the modified pigment product.

As with conventional pigments, the modified pigment products can be used with a variety of plastics, including but not limited to, plastics made from thermoplastic resins, thermosetting resins, or engineered materials, for example, composites. Typical kinds of thermoplastic resins include: (1) acrylonitrile-butadiene-styrene (ABS) resins; (2) acetals; (3) acrylics; (4) cellulosics; (5) chlorinated polyethers; (6) fluorocarbons, such as polytetrafluoroethylene (TFE), polychlorotrifluoroethylene (CTFE), and fluorinated ethylene propylene (FEP); (7) nylons (polyamides); (8) polycarbonates; (9) polyethylenes (including copolymers); (10) polypropylenes (including copolymers); (11) polystyrenes; (12) vinyls (polyvinyl chloride); (13) thermoplastic polyesters, such as polyethylene terephthalate or polybutylene terephthalate; (14) polyphenylene ether alloys; and blends and alloys of the above with rubber modifiers. Typical thermosetting resins include: (1) alkyds; (2) allylics; (3) the aminos (melamine and urea); (4) epoxies; (5) phenolics; (6) polyesters; (7) silicones; and (8) urethanes.

According to the invention, the term plastic composition includes, but is not limited to, any plastic material, article, goods, surface, fabric, sheet, film, and the like. For example, plastic materials include automotive parts, siding for homes, liners for swimming pools, roofing materials, packaging materials, synthetic fibers, food, and storage containers, light absorbing applications (e.g., bar codes), and any variety of other household or industrial items.

From the foregoing it will also be understood that the present invention can be used in preparing polymer foams comprising modified pigment. In preferred embodiments the filler is preferentially located in the windows of the foam cells.

The modified pigment products of the present invention may also be used, as with conventional pigments, in the compounding and preparation of rubber and elastomer compositions. Accordingly, the present invention relates to preparing a rubber or elastomeric composition containing at least one rubber or elastomer and at least one modified pigment using the methods of the present invention.

Carbon blacks, for example, are useful in the preparation of rubber vulcanizates such as those in tires. It is generally desirable in the production of tires to utilize carbon blacks which produce tires with satisfactory abrasion resistance and hysteresis performance. The treadwear properties of a tire are related to abrasion resistance. The greater the abrasion resistance, the greater the number of miles the tire will last without wearing out. The hysteresis of a rubber compound means the difference between the energy applied to deform a rubber compound, and the energy released as the rubber compound recovers to its initial undeformed state. Tires with lower hysteresis values reduce rolling resistance and therefore are able to reduce the fuel consumption of the vehicle utilizing the tire. Thus, it is particularly desirable to have carbon black products capable of imparting greater abrasion resistance and lower hysteresis in tires.

The modified pigment products, and preferably the modified carbon black products of this invention are useful in rubbers. Carbon black products comprising an aromatic sulfides group are preferred for this use. The carbon black products or other pigments of the invention can be used in rubber compositions which are sulfur-cured, peroxide-cured, or chemically crosslinked.

The modified pigment products of the invention may be used with any of the polymers described above, including synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide; also suitable for use herein are copolymers of dienes, ethylene, and other high alpha olefins such as propylene, butene-1 and pentene-1. They can also be used with natural rubber.

The rubber composition of the present invention can therefore contain at least one elastomer, curing agents, reinforcing filler, a coupling agent, and, optionally, various processing aids, oil extenders, and antidegradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3 butadiene, acrylonitrile, ethylene, propylene, and the like. It is preferred that these elastomers have a glass transition point (Tg), as measured by DSC, between $-120°$ C. and $0°$ C. Examples of such elastomers include poly(butadiene), poly(styrene-co-butadiene), poly(isoprene), styrene-butadiene rubber (SBR), natural rubber, and their oil-extended derivatives. Blends of any of the foregoing may also be used.

Elastomeric compositions disclosed in the present invention and which can be prepared include, but are not limited to, vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without loss of performance characteristics.

The elastomeric composition may include one or more curing agents such as, for example, sulfur, sulfur donors, activators, accelerators, peroxides, and other additive systems used to effect vulcanization of the elastomer composition.

The resultant elastomeric compounds containing the modified pigment, and preferably modified carbon black of the present invention and optionally containing one or more coupling agents may be used for various elastomeric products, including tires and components thereof, such as a tread compound, undertread compound, sidewall compound, wire skim compound, innerliner compound, bead, apex, any compound used in carcass and other components for vehicle tires, industrial rubber products, seals, timing belts, power transmission belting, and other rubber goods.

Advantageously, the modified pigment products, and especially the modified carbon black products of the present invention can impart improved abrasion resistance and/or reduced hysteresis to rubber or elastomeric compositions containing them.

The modified pigment products of this invention may also be used to color fibers or textiles. Preferred modified pigment products for this use are the dispersible modified pigment products. Accordingly, the invention relates to fiber and textile compositions comprising a fiber or textile and a modified pigment product. Fibers suitable for use comprise natural and synthetic fibers such as cotton, wool, silk, linen, polyester and nylon. Textiles suitable for use comprise natural and synthetic fibers such as cotton, wool, silk, linen, polyester and nylon. Preferably natural fibers and textiles comprising cotton, wool, silk, and linen are used.

The modified pigment products of the present invention may be colored by means known in the art to color fibers and textiles with, for example, direct and acid dyes. Also, the modified pigments can be incorporated into fibers by spinning techniques, such as wet spinning, dry spinning, and melt spun techniques. For a general discussion of coloring with dyes, see Kirk-Othmer Encyclopedia of Chemical Technology, Vol. 8 pp 280–350 "Dyes, Application and Evaluation" (John Wiles and Sons, 1979), incorporated herein by reference. Use of a water or solvent dispersible modified pigment product discussed above provides a method for coloring these materials with a lightfast colorant.

The present invention also relates to toner compositions comprising toner resin particles and the modified pigment particles of the present invention wherein the toner resin particle can be formed using the methods described herein. Conventional additives as described in U.S. Pat. Nos. 5,278,018; 5,510,221; 5,275,900; 5,571,654; and 5,484,575; and EP O 270-066A1 can be used and these patents are incorporated herein by reference.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims and equivalents thereof.

What is claimed is:

1. A method of preparing a polymer composition comprising at least one polymer and at least one modified pigment, wherein said method comprises introducing at least one slurry containing at least one modified pigment to an aqueous-based polymer solution to form a mixture;

wherein said aqueous based polymer solution has not been dewatered; and dewatering said mixture to form the polymer composition.

2. The method of claim 1, wherein said aqueous-based polymer solution is an emulsion polymer solution.

3. The method of claim 1, wherein said aqueous-based polymer solution is a suspension polymer solution.

4. The method of claim 1, wherein said aqueous-based polymer solution is a free radical polymer solution.

5. A method of preparing a polymer composition comprising at least one polymer and at least one modified pigment comprising introducing at least one slurry containing at least one modified pigment to a precursor of an aqueous-based polymer solution;

conducting polymerization of the precursor to form a polymer product; and dewatering the polymer product to form the polymer composition.

6. A method of preparing a polymer composition comprising at least one polymer and at least one modified pigment, comprising attaching at least one organic group onto a pigment in the presence of an aqueous-based polymer solution to form a polymer product;

dewatering the polymer product to form the polymer composition.

7. A method of preparing a polymer composition comprising at least one polymer and at least one modified pigment, wherein said method comprises introducing at least one slurry containing at least one modified pigment to a quenched polymer solution and a polymerization solvent to form a mixture; and washing said mixture to form the polymer composition.

8. A method of forming a polymer composition comprising at least one polymer and at least one modified pigment, wherein said method comprises attaching at least one organic group onto a pigment in the presence of a quenched and unwashed solution polymer and polymerization solvent; and washing said mixture to form the polymer composition.

9. A method of preparing a polymer composition comprising at least one polymer and at least one modified pigment;

wherein said method comprises introducing a modified pigment having attached at least one organic group into a solution containing at least one living polymer; and terminating the polymerization of the living polymer.

10. The method of claim 9, wherein said termination is accomplished by at least one organic group attached and part of said modified pigment.

11. A polymer composition comprising a slurry comprising at least one modified pigment and a polymer solution.

12. The method of claim 1, wherein said slurry is produced by micropulverizing modified pigment in water.

13. The method of claim 1, wherein said slurry is produced by micropulverizing modified pigment in a solvent.

14. The method of claim 1, wherein said slurry is produced by micropulverizing modified pigment in a dry process and then adding ground pigment to a liquid in a separate mixer.

15. The method of claim 5, wherein said slurry is produced by micropulverizing modified pigment in water.

16. The method of claim 5, wherein said slurry is produced by micropulverizing modified pigment in a solvent.

17. The method of claim 5, wherein said slurry is produced by micropulverizing modified pigment in a dry process and then adding ground pigment to a liquid in a separate mixer.

18. The method of claim 7, wherein said slurry is produced by micropulverizing modified pigment in water.

19. The method of claim 7, wherein said slurry is produced by micropulverizing modified pigment in a solvent.

20. The method of claim 7, wherein said slurry is produced by micropulverizing modified pigment in a dry process and then adding ground pigment to a liquid in a separate mixer.

21. The method of claim 1, wherein said modified pigment is modified carbon black, modified carbon fiber, modified activated carbon, modified graphite, modified activated graphite, modified carbon cloth, modified vitreous carbon, or combinations thereof.

22. The method of claim 1, wherein said modified pigment is modified carbon black.

23. The method of claim 1, wherein said modified pigment is modified carbon product.

24. The method of claim 23, wherein said modified carbon product is an aggregate comprising a carbon phase and a silicon-containing species phase.

25. The method of claim 23, wherein said modified carbon product is an aggregate comprising a carbon phase and a metal-containing species phase or is a silica-coated carbon black.

26. The method of claim 23, wherein said modified carbon product is a carbon product having attached aromatic sulfide groups.

27. The method of claim 1, wherein said modified pigment is carbon black having attached at least one organic group.

28. The method of claim 27, wherein said organic group comprises an aromatic group or a $C_1$–$C_{100}$ alkyl group, or both.

29. The method of claim 1, wherein said polymer is a solution SBR, natural rubber, functionalized solution SBR, emulsion SBR, polybutadiene, polyisoprene, or blends thereof.

* * * * *